(12) United States Patent
Achiwa

(10) Patent No.: US 10,325,189 B2
(45) Date of Patent: Jun. 18, 2019

(54) IMAGE PROCESSING APPARATUS AND IMAGE PROCESSING METHOD THAT PERFORM, IN UNITS OF BAND AREAS, RASTERIZATION BASED ON SECOND INTERMEDIATE DATA STORED IN A FIRST MEMORY AREA AND COMPRESSED RASTER DATA STORED IN A SECOND MEMORY AREA

(71) Applicant: CANON KABUSHIKI KAISHA, Tokyo (JP)

(72) Inventor: Ken Achiwa, Kashiwa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/719,945

(22) Filed: Sep. 29, 2017

(65) Prior Publication Data

US 2018/0101754 A1    Apr. 12, 2018

(30) Foreign Application Priority Data

Oct. 6, 2016   (JP) .................................. 2016-198305

(51) Int. Cl.
*G06F 3/12* (2006.01)
*G06K 15/02* (2006.01)
*G06K 15/00* (2006.01)

(52) U.S. Cl.
CPC ....... *G06K 15/184* (2013.01); *G06K 15/1857* (2013.01); *G06K 15/1861* (2013.01); *G06K 15/1863* (2013.01); *G06K 2215/0051* (2013.01)

(58) Field of Classification Search
None
See application file for complete search history.

(56) References Cited

U.S. PATENT DOCUMENTS

| 9,600,747 | B2 | 3/2017 | Achiwa |
| 2008/0198414 | A1* | 8/2008 | Ozawa .................. G06K 15/00 358/1.17 |

FOREIGN PATENT DOCUMENTS

JP    2012-254583 A    12/2012

* cited by examiner

*Primary Examiner* — Dov Popovici
(74) *Attorney, Agent, or Firm* — Venable LLP

(57) ABSTRACT

An image processing method of performing rasterization of a page in units of band area includes, among other things, performing, in units of band areas, rasterization based on second intermediate data stored in a first memory area for storing intermediate data and compressed raster data stored in a second memory area. The rasterization of the plurality of band areas is performed in parallel. In addition, the performing of the rasterization based on the second intermediate data and the compressed raster data includes selectively decompressing, in units of predetermined areas, a piece of the compressed raster data stored in the second memory area, in accordance with which band areas, of a plurality of band areas, are to be subject to the rasterization.

11 Claims, 12 Drawing Sheets

IMAGE PROCESSING APPARATUS AND IMAGE PROCESSING METHOD THAT PERFORM, IN UNITS OF BAND AREAS, RASTERIZATION BASED ON SECOND INTERMEDIATE DATA STORED IN A FIRST MEMORY AREA AND COMPRESSED RASTER DATA STORED IN A SECOND MEMORY AREA

This application claims the benefit of Japanese Patent Application No. 2016-198305, filed Oct. 6, 2016, which is hereby incorporated by reference herein in its entirety.

BACKGROUND OF THE INVENTION

Field of the Invention

The present invention relates to an image processing apparatus that performs drawing processing in parallel by a plurality of drawing processing units, and a related image processing method.

Description of the Related Art

Conventionally, it is known widely that the processing efficiency of image processing can be improved by interpreting drawing data in units of pages to generate intermediate data called a display list (DL), and by performing parallel processing after dividing the intermediate data into rectangular areas in units of blocks. In particular, the block unit in the shape of a square tile (for example, 32 pixels×32 pixels) is excellent in that the memory capacity for primary storage may be comparatively small, that the block unit does not depend on the image size or the resolution, that the image shape does not change before and after rotation processing, and so on.

Further, Japanese Patent Laid-Open No. 2012-254583 has disclosed a technique to perform parallel processing by dividing the intermediate data (DL) into units of bands including rectangular areas in units of blocks, and then to divide the intermediate data, in units of bands, into units of blocks in order to distribute the load of processing.

Furthermore, in a case in which the memory capacity runs short at the time of performing drawing processing for the intermediate data (DL), a fallback process is performed. In the fallback process, the drawing processing of the intermediate data (DL) is divided into a plurality of pieces and performed a plurality of times within the memory capacity while saving image data generated temporarily in the memory.

With the technique disclosed in Japanese Patent Laid-Open No. 2012-254583, however, in a case in which the drawing processing in units of bands is performed in parallel, the memory to store image data that is saved at the time of the fallback process needs to have a capacity enough for the number of parallel operations of the drawing processing. Further, with the technique disclosed in Japanese Patent Laid-Open No. 2012-254583, the decompression processing unit configured to decompress the saved image data also needs to be provided in a number corresponding to the number of parallel operations of the drawing processing. As described above, the conventional parallel drawing processing in units of bands increases hardware resources (circuit scale), resulting in a rise in the cost.

Consequently, even in a case in which the drawing processing in units of bands is performed in parallel, it is desired to increase the speed of the drawing processing by performing the drawing processing efficiently while suppressing a rise in the cost due to an increase of hardware resources.

SUMMARY OF THE INVENTION

An image processing method of performing rasterization of a page in units of band area comprises receiving page description data of the page, generating first data drawing a first group of objects included in the page from a piece of the received page description data, storing the generated first data into a first memory area, performing, in units of band areas, rasterization based on the stored first data to generate a first raster data of the page, wherein the rasterization of a plurality of band areas is performed concurrently, compressing, in units of predetermined areas, the first raster data generated by the rasterization of the first data, each predetermined area overlapping a plurality of adjacent band areas storing the compressed raster data into a second memory area, deleting the first data from the first memory area, generating second data drawing a second group of objects included in the page from another piece of the received page description data, storing the generated second data into the first memory area, and performing, in units of band areas, rasterization based on the second data stored in the first memory area and the compressed raster data stored in the second memory area, wherein the rasterization of a plurality of band areas is performed concurrently, and the performing of the rasterization based on the second data and the compressed raster data includes selectively decompressing, in units of predetermined areas, a piece of the compressed raster data stored in the second memory area, in accordance with which band areas are to be subject to the rasterization.

Further features of the present invention will become apparent from the following description of exemplary embodiments with reference to the attached drawings.

Figure 3A:
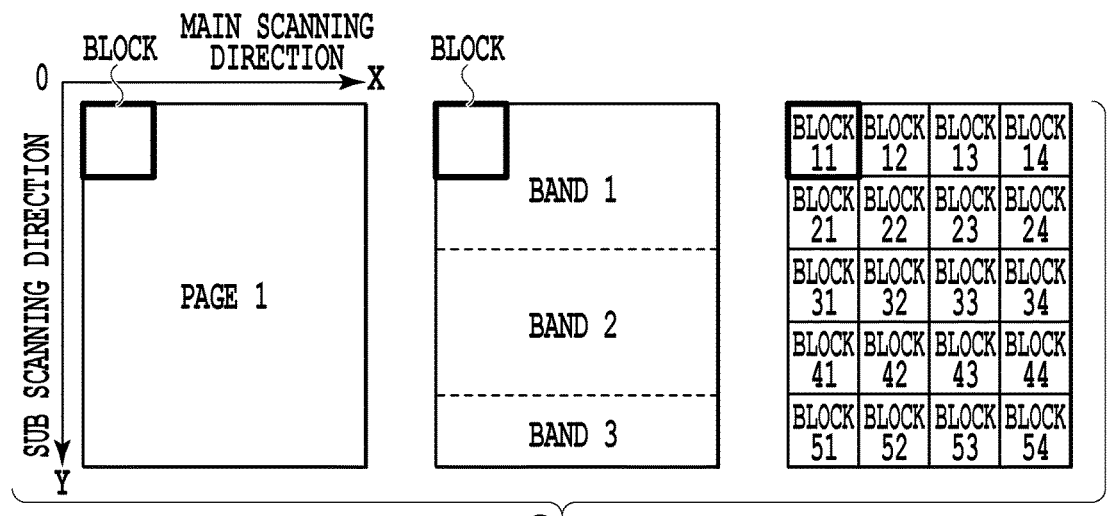
Figure 3B:
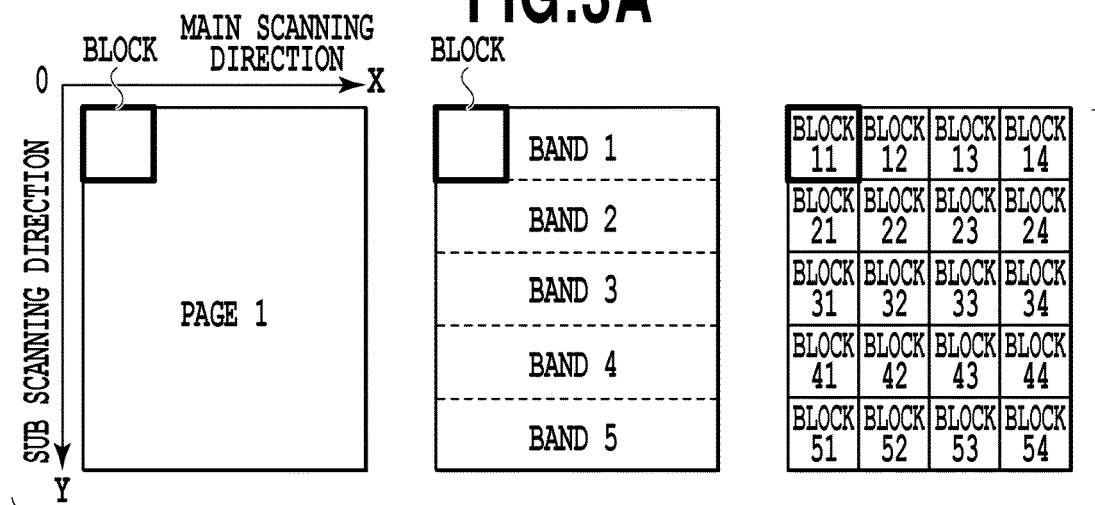
Figure 3C:
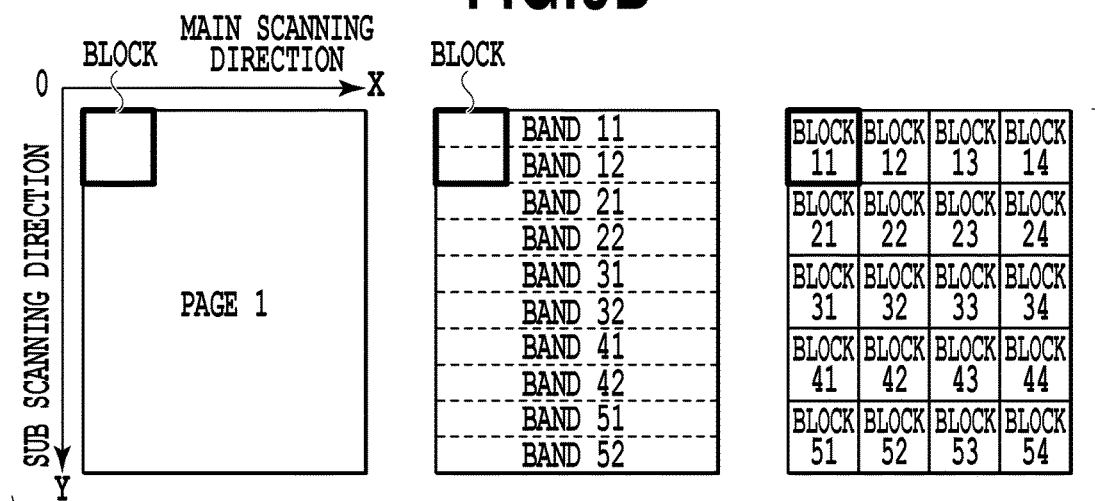

Each of FIGS. 3A to 3C is a diagram showing an example of a coordinate system of a rectangular area within a page handled by the image forming apparatus.

Figure 4A:
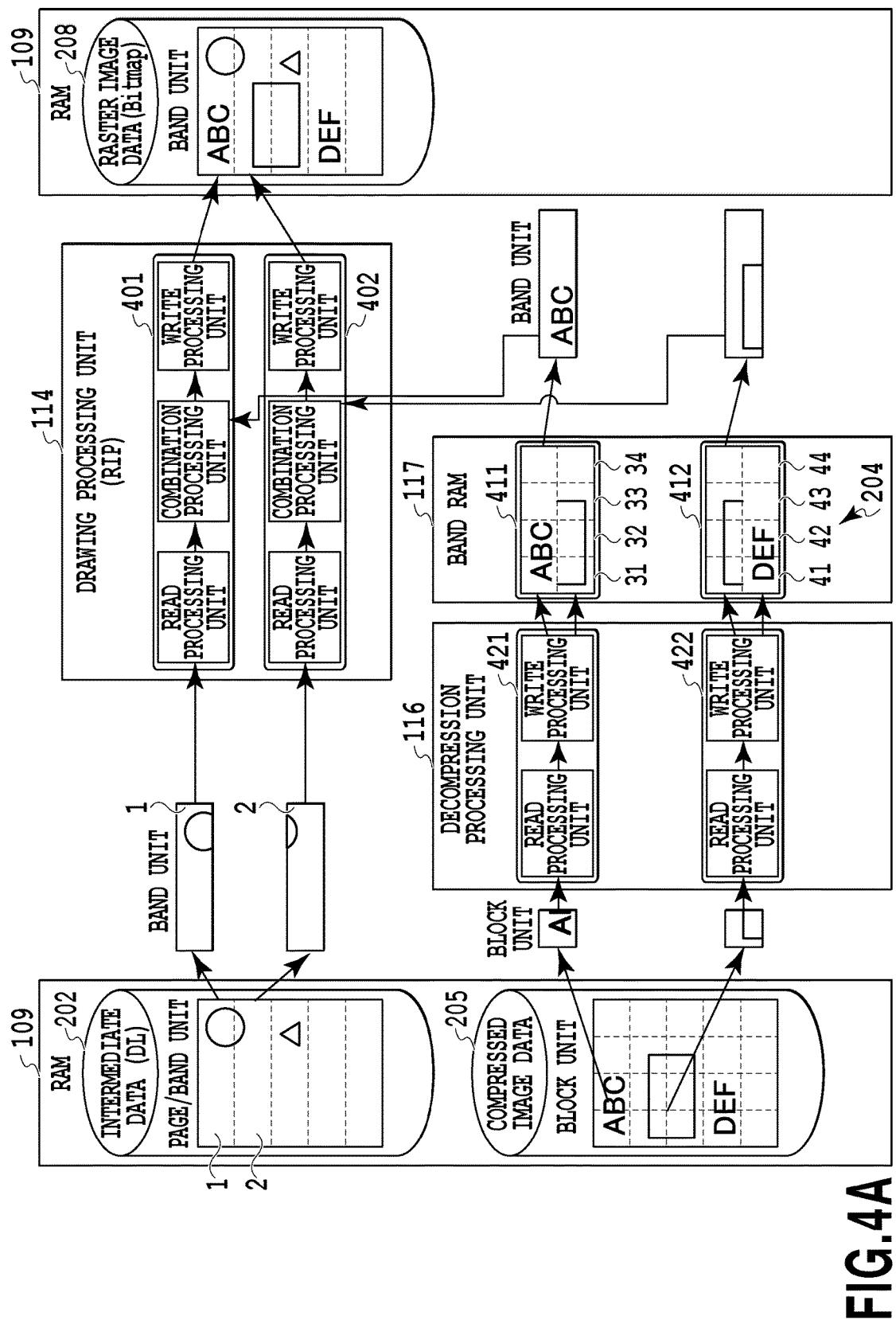
Figure 4B:
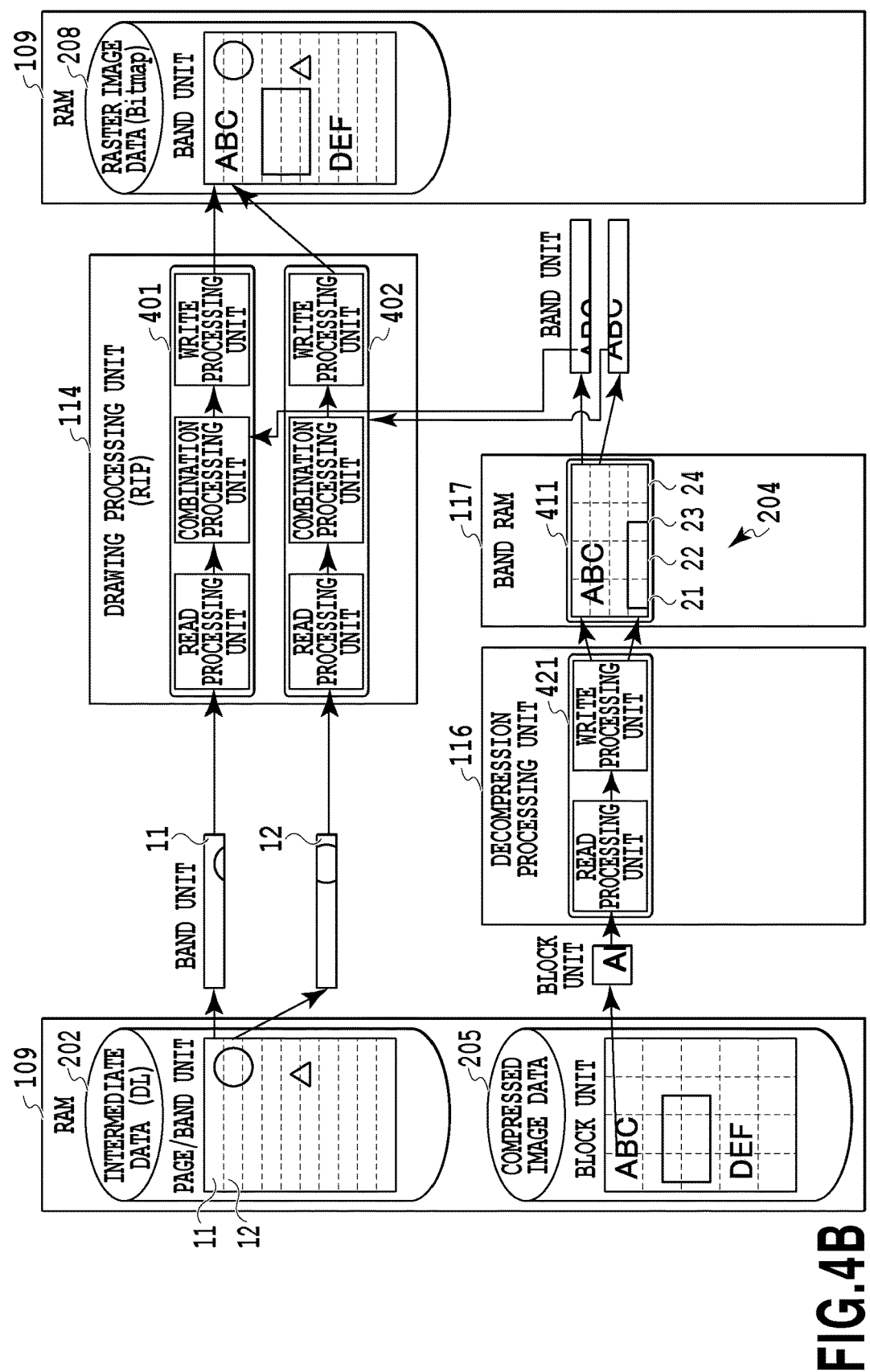

Each of FIG. 4A and FIG. 4B is a diagram showing a function block configuration relating to drawing processing.

Figure 5:
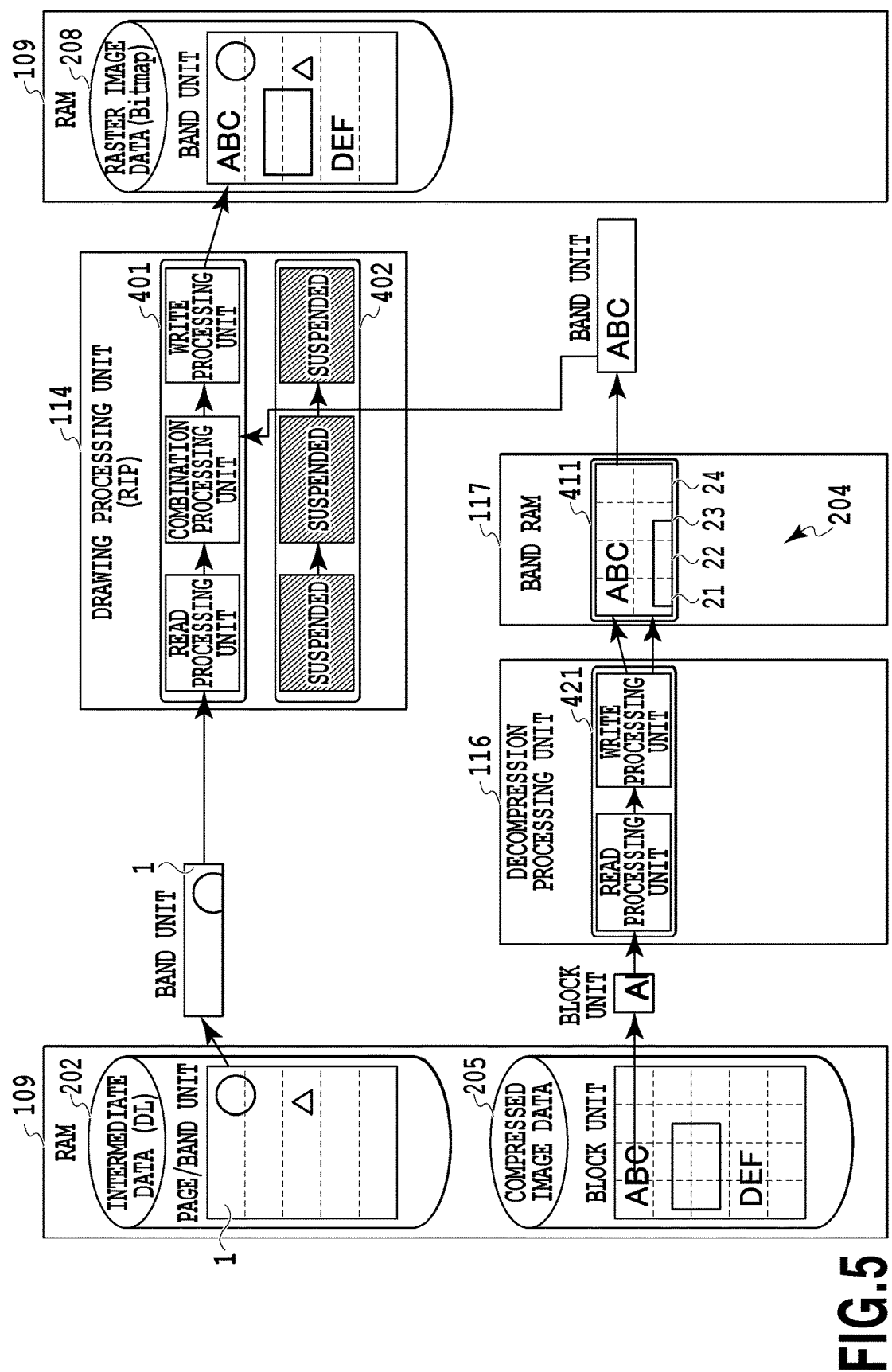

FIG. 5 is a diagram showing a state in which part of the function block configuration relating to drawing processing is suspended.

Figure 6:
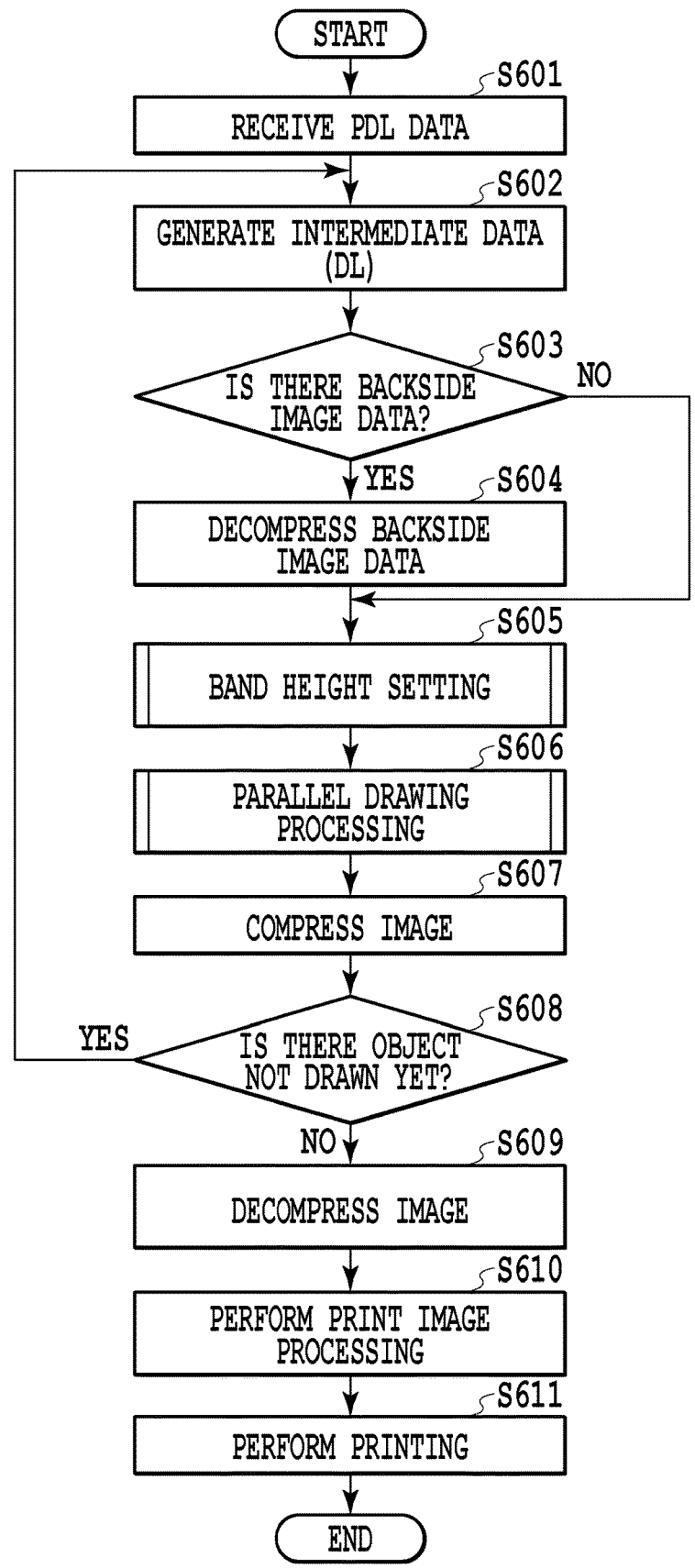

FIG. 6 is a flowchart of PDL printing processing.

Figure 7:
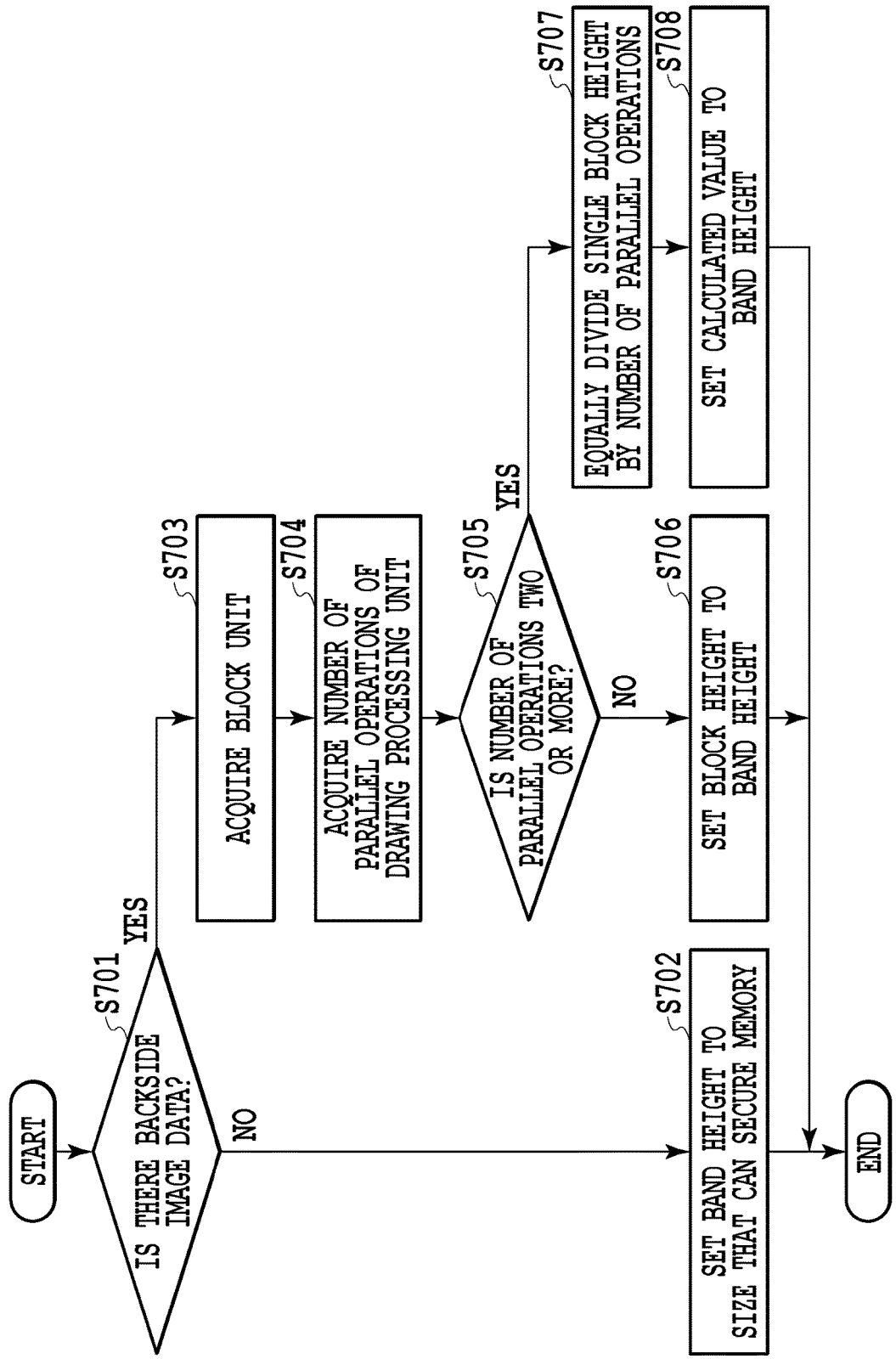

FIG. 7 is a flowchart of band height setting processing.

Figure 8:
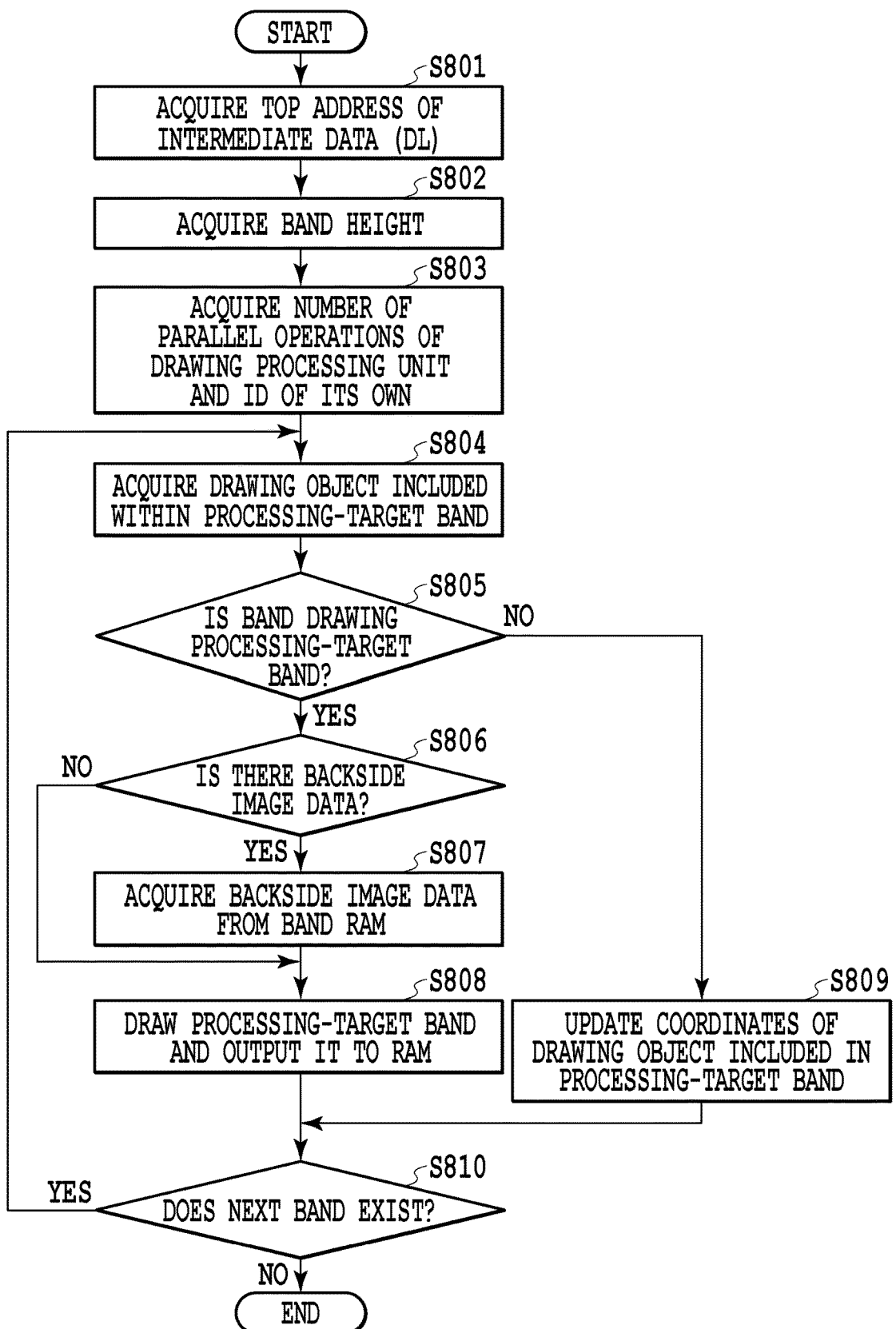

FIG. 8 is a flowchart of parallel drawing processing.

FIGS. 9A to 9E are diagrams explaining access control of write in units of blocks and read in units of bands.

Figure 10:
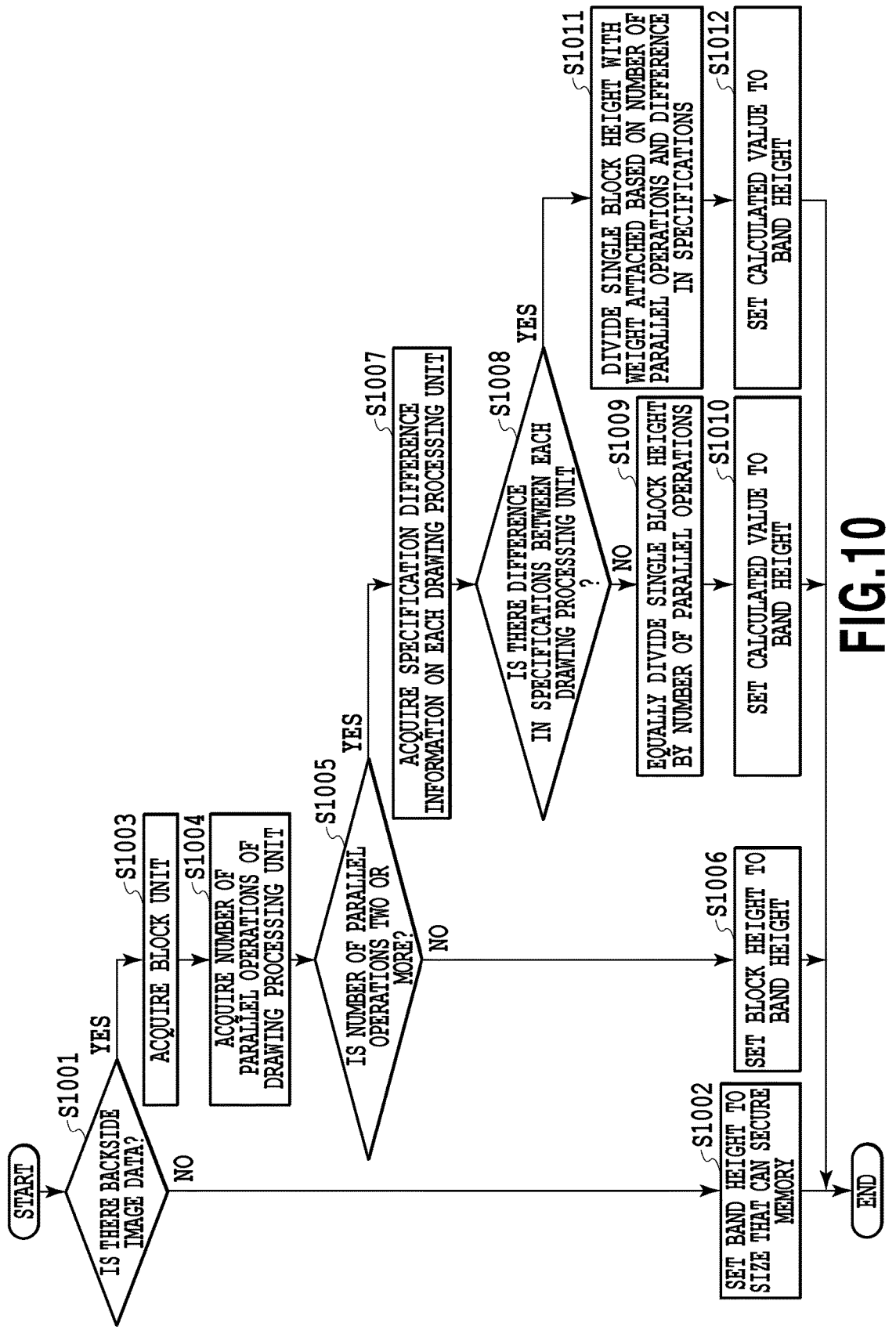

FIG. 10 is a flowchart of band height setting processing.

Each of FIGS. 11A to 11E is a diagram showing a positional relationship between rectangular areas in units of blocks and in units of bands.

DESCRIPTION OF THE EMBODIMENTS

In the following, embodiments of the present invention are explained in detail with reference to the drawings. The embodiments explained below are merely exemplary and are not intended to limit the present invention. Throughout the drawings, the same symbol indicates the same component.

Figure 1:
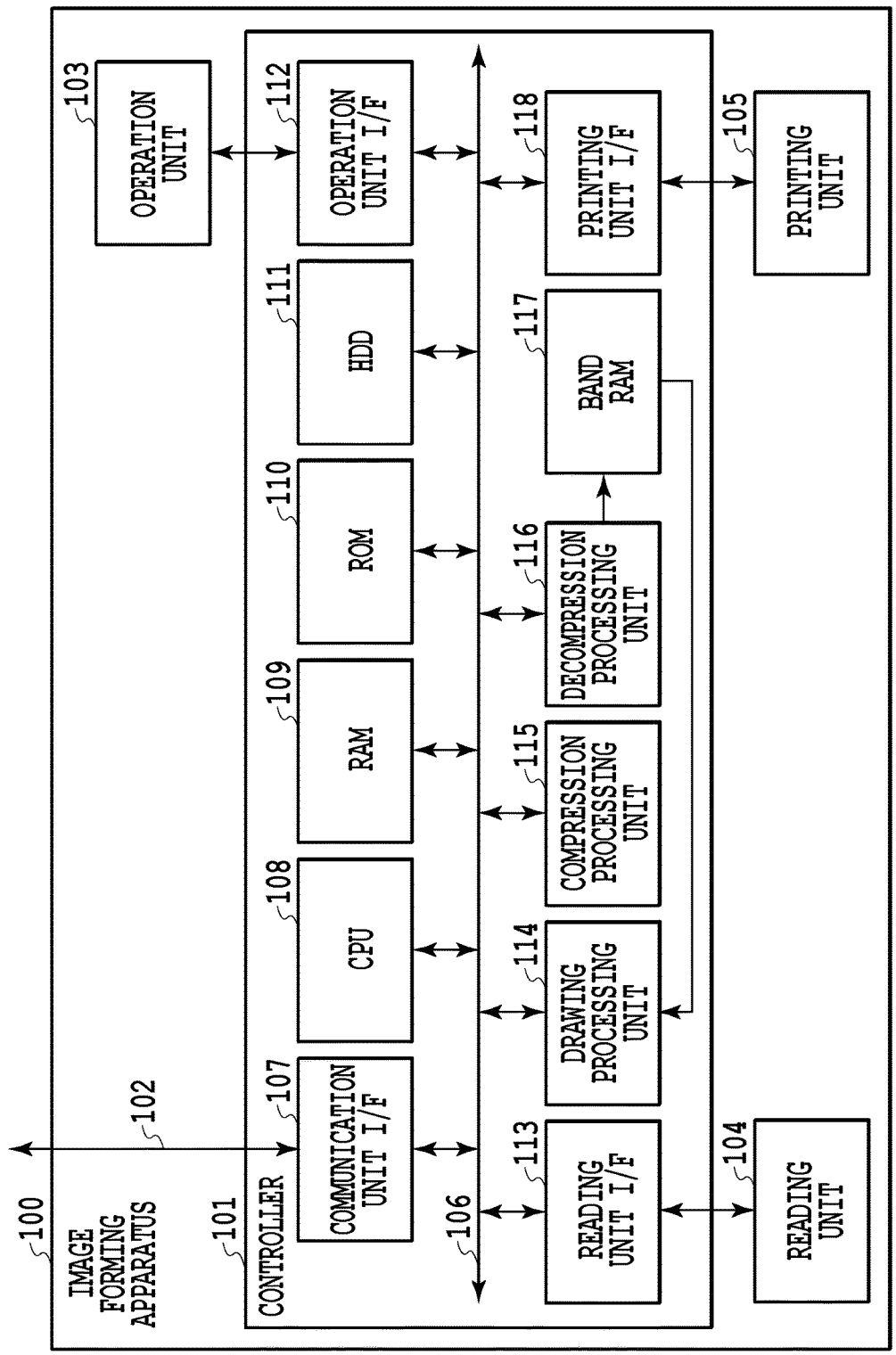
FIG. 1 is a block diagram showing a configuration of an image forming apparatus.

FIG. 1 is a block diagram showing a configuration example of an image forming apparatus in an embodiment of the present invention. As shown in FIG. 1, an image forming apparatus 100 includes a controller 101, a network 102, an operation unit 103, a reading unit 104, and a printing unit 105.

The network 102 is a communication unit implemented by a local area network (LAN), a wide area network (WAN) (public circuit), and so on, and is configured to transmit and to receive image data and device information between an external device, such as a host computer and a server, and the image forming apparatus 100. The operation unit 103 is a processing unit configured to acquire an operation by a user as control information on image processing, to display control information on image processing to a user, and so on. The reading unit (scanner engine) 104 is an image input device and is a processing unit configured to take in image data inside the image forming apparatus 100 by using an optical sensor, and the like. The printing unit (printer engine) 105 is an image output device and is a processing unit configured to print image data inside the image forming apparatus 100 on a printing medium.

The controller 101 is a control unit connected with the network 102, the operation unit 103, the reading unit 104, and the printing unit 105, and is configured to control the entire image forming apparatus 100. The controller 101 includes a system bus 106, a communication interface (I/F) 107, a central processing unit (CPU 108), a random access memory (RAM) 109, a read-only memory (ROM) 110, a hard disk drive (HDD) 111, an operation unit I/F 112, and a reading unit I/F 113. Further, the controller 101 includes a drawing processing unit 114, a compression processing unit 115, a decompression processing unit 116, a band RAM 117, and a printing unit I/F 118. It is possible to mount the controller 101 to an image processing apparatus, and the controller 101 may have, for example, a configuration in which the reading unit 104 and the printing unit 105 are not included.

The system bus 106 is a processing unit configured to connect each processing unit making up the controller 101, and to transmit and to receive image data and control information between each processing unit. The transmission unit I/F 107 is implemented by, for example, a LAN card, and the like, and is an interface unit configured to transmit and to receive image data and device information between an external device, such as a host computer and a server, and the image forming apparatus 100 via the network 102.

The CPU 108 is a processing unit configured to control the entire image forming apparatus 100. In particular, in PDL printing processing, the CPU 108 performs processing to interpret drawing data, such as PDL data, received from an external device via the network 102, and to convert the drawing data into intermediate data called the DL (Display List). Here, explanation is given on the assumption that PDL data, as an example of drawing data, is processed.

The RAM (volatile memory) 109 is a storage unit used as a work area for the CPU 108 to operate on the system, used as a buffer area to primarily store image data, and so on. The ROM (nonvolatile memory) 110 is a primary storage unit in which a program for the CPU 108 to activate the system is stored. This program is loaded onto the RAM 109 at the time of activation of the image forming apparatus 100 and is executed by the CPU 108.

The HDD 111 is a large-capacity storage unit configured to store image data inside the image forming apparatus 100.

The operation unit I/F 112 is an interface unit connected with the operation unit 103 and configured to acquire an operation by a user as control information on image processing, to display control information on image processing to a user, and so on. The reading unit I/F (scanned image processing unit) 113 is an image processing unit connected with the reading unit (scanner engine) 104, and is configured to perform image processing for correction in accordance with the device characteristics of the reading unit 104 for image data input from the reading unit 104.

The drawing processing unit (that may also be a Raster Image Processor (RIP)) 114 refers to intermediate data (DL) in the vector format generated by the CPU 108, generates image data in the raster format, and stores the image data in the RAM 109. Further, the drawing processing unit 114 performs, in the case of processing the remaining intermediate data (DL) following fallback processing, image combination with the image data saved in the band RAM 117 and generates image data in the raster format.

The compression processing unit 115 generates compressed image data by performing compression processing for the image data in the raster format generated by the drawing processing unit 114 and stores the compressed image data in the RAM 109.

The decompression processing unit 116 performs decompression processing of the compressed image data for which the compression processing has been performed by the compression processing unit 115. In particular, in the drawing processing of intermediate data (DL) following the fallback processing, the decompression processing unit 116 performs decompression processing for the saved image data and provides the image data to the drawing processing unit 114 via the band RAM 117.

The band RAM 117 is a local memory that primarily stores image data in the raster format, which is output from the decompression processing unit 116 to the drawing processing unit 114, and is a fallback memory used for the drawing processing following the fallback processing. Further, the band RAM 117 includes an access detection device, not shown schematically, and detects writing of image data to a specific address of its own and reading of image data from a specific address.

The operations of the drawing processing unit 114, the compression processing unit 115, the decompression processing unit 116, and the band RAM 117 relating to the drawing processing at the time of PDL printing will be explained in more detail with reference to FIG. 4A and FIG. 4B.

The printing unit I/F (print image processing unit) 118 is an image processing unit connected with the printing unit (printer engine) 105, and is configured to output image data to the printing unit 105 after performing image processing for correction in accordance with the device characteristics of the printing unit 105.

In FIG. 1, the configuration example is shown in which the drawing processing unit 114 and the decompression processing unit 116 are directly connected via the band RAM 117 as a local memory, but the configuration of the image forming apparatus 100 is not limited to this configuration. Further, for example, it may also be possible to make up the compression processing unit 115 by connecting it general-purposely on the system bus 106, or to make up the compression processing unit 115 by connecting it dedicatedly to a processing unit for which compression processing is necessary, such as the reading unit I/F 113 and the drawing processing unit 114. Similarly, it may also be possible to make up the decompression processing unit 116 by connecting it general-purposely on the system bus 106, or to make up the decompression processing unit 116 by connecting it dedicatedly to a processing unit for which decompression processing is necessary, such as the printing unit I/F 118.

Figure 2:
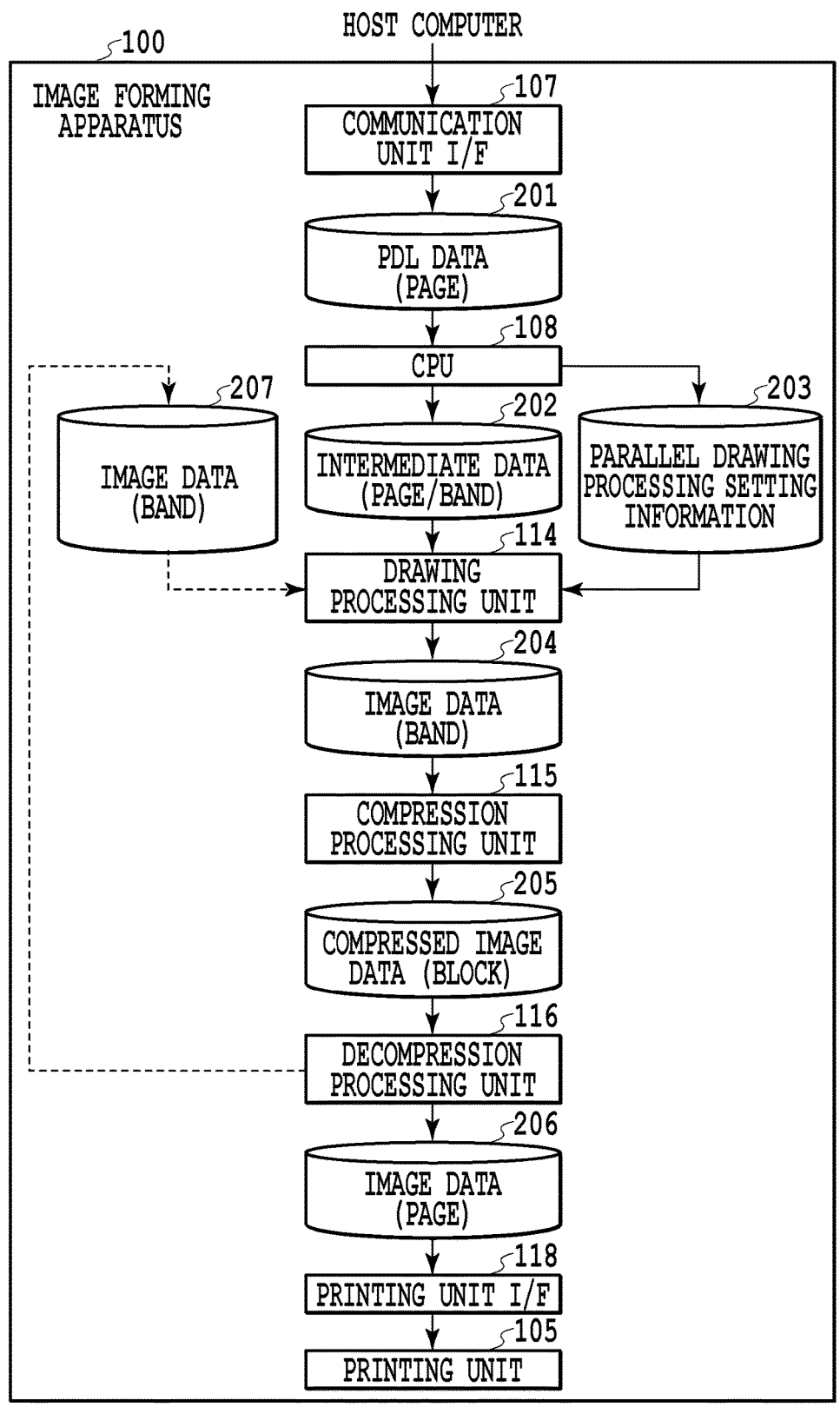
FIG. 2 is a diagram showing a data flow of page description language (PDL) printing processing in the image forming apparatus.

Next, with reference to FIG. 2 and FIGS. 3A to 3C, a data flow of PDL printing processing in the image forming apparatus 100 and a relationship between image data units are explained. FIG. 2 shows a data flow of PDL printing processing in the image forming apparatus 100. In FIG. 2, in particular, the broken line portion relates to the fallback processing that is performed in a case in which the intermediate data (DL) is greater than a predetermined storage capacity secured on the RAM 109. FIGS. 3A to 3C each show an example of a coordinate system of a rectangular area within a page handled by the image forming apparatus 100. The data flow shown in FIG. 2 is performed by the CPU 108 executing a program loaded onto the RAM 109 of the image forming apparatus 100.

First, the data flow at the normal time in the PDL printing processing is explained with reference to FIG. 2. The data flow at the "normal time" means a data flow in a case in which the fallback processing is not performed.

As shown in FIG. 2, the image forming apparatus 100 first receives PDL data transmitted from the host computer by the communication unit I/F 107 and stores the PDL data in the RAM 109 or the HDD 111 as PDL data 201 in units of pages.

Next, the CPU 108 interprets the PDL data 201 in units of pages, generates intermediate data (DL) 202 in units of pages or in units of bands, and stores the intermediate data (DL) 202 in the RAM 109 again. The band unit is a rectangular area obtained by dividing a single page in a sub-scanning direction (Y-direction) as shown in FIGS. 3A to 3C, and means a rectangular area (band area) in the shape of a strip in which the number of pixels in the sub-scanning direction is less than the number of pixels in the main scanning direction (X-direction). The block unit means a rectangular area (block area) in the shape of a square tile in which the number of pixels in the main scanning direction and the number of pixels in the sub-scanning direction, determined in advance in the image forming apparatus 100, are the same as shown in FIGS. 3A to 3C. The difference between FIG. 3A, FIG. 3B, and FIG. 3C is whether or not the rectangular area in units of blocks is in a positional relationship in which the rectangular area is included in the rectangular area in units of bands. FIG. 3A and FIG. 3B show the conventional relationship in which the block is included in the single band and the single band is made up of a set of a plurality of blocks. In particular, FIG. 3B shows an example in which the height in the sub-scanning direction (the number of pixels in the sub-scanning direction) of the block is equal to that of the band. On the other hand, FIG. 3C shows an image data unit appropriate to perform drawing processing in parallel in an embodiment of the present invention. In FIG. 3C, the block and the band are not included in each other, and a relationship is satisfied in which the number of pixels in the sub-scanning direction of the block (height of the block) is divided by the height of a plurality of bands. Specifically, in single page 1, a relationship is satisfied in which the number of pixels in the sub-scanning direction of single block 11 is divided by each band height of band 11 and band 12. In the following explanation, the examples of the coordinate system of the band unit and the block unit within the page 1 shown in FIGS. 3A to 3C are used separately in accordance with the necessity.

Further, the CPU 108 sets parallel drawing processing setting information 203 relating to the parallel operation of the drawing processing unit 114 to the internal register of the drawing processing unit 114, generates intermediate data (DL), and stores the intermediate data (DL) in the RAM 109. In the parallel drawing processing setting information 203, the top address of the RAM 109, in which the intermediate data (DL) is stored, the number of parallel operations of the drawing processing unit 114, the number of pixels (band height) in the sub-scanning direction of the band to be drawn, and so on, are included.

Next, the drawing processing unit 114 refers to the intermediate data (DL) 202 stored in the RAM 109, and performs the drawing processing in parallel for the rectangular area of a plurality of band units within the single page 1. By performing the drawing processing in parallel in units of bands, the drawing processing unit 114 generates image data 204 in the raster format of a plurality of bands, and primarily stores the image data 204 in the RAM 109.

Next, the compression processing unit 115 reads image data in units of blocks from the image data 204 in units of bands primarily stored in the RAM 109. In a case in which the single block is made up of a plurality of bands, the image data 204 of a plurality of band units making up the signal block is combined, and from the combined image data 204 of a plurality of band units, image data in units of blocks is read. Then, the compression processing unit 115 generates compressed image data 205 by performing compression processing, such as Joint Photographic Experts Group (JPEG) processing, for the read image data in units of blocks, and stores the compressed image data 205 in the RAM 109 or the HDD 111 again.

Next, the decompression processing unit 116 generates image data in the raster format by performing decompression processing, such as JPEG processing, for the compressed image data 205 compressed in units of blocks. Then, the decompression processing unit 116 generates image data 206 in the raster format in units of pages by combining all the image data in the raster format in units of blocks making up the single page, and primarily stores the image data 206 in the RAM 109 again.

Next, the printing unit I/F 118 reads the image data in units of pages primarily stored in the RAM 109, and outputs the corrected image data to the printing unit 105 after performing image processing for correction in accordance with the device characteristics of the printing unit 105.

Next, the printing unit (printer engine) 105 prints the image data output from the printing unit I/F 118 on a printing medium.

As described above, the data flow at the normal time in the PDL printing processing is explained. Next, a data flow at the time of fallback processing in the PDL printing processing is explained by particularly focusing attention on the broken line portion in FIG. 2.

At the time of interpreting the PDL data 201 and generating the intermediate data (DL) 202, the CPU 108 determines whether the intermediate data (DL) 205 making up a single page is greater than the predetermined storage capacity secured on the RAM 109. In a case in which the intermediate data (DL) 202 is greater than the predetermined storage capacity (that is, in a case in which the storage capacity runs short), the CPU 108 stores the drawing objects in the RAM 109 as the intermediate data (DL) 202 in the order from the drawing object to be drawn on the backside within a range that does not exceed the predetermined storage capacity. Image data 207 in the raster format, which is obtained via the compression processing unit 115 and the decompression unit 116 by performing drawing processing for the intermediate data (DL) 202 by the drawing processing unit 114, is primarily stored in the band RAM 117. This image data 207 is called backside image data in the fallback processing. The CPU 108 creates an empty area of the RAM 109 by deleting the intermediate data 202 stored in the RAM 109 after storing the image data 207 in the band RAM 117. Then, the CPU 108 stores the remaining intermediate data in the RAM 109. The backside image data is primarily stored in the band RAM 117 as image data for image combination and the drawing processing unit 114 refers to and uses this image data for drawing processing. That is, it is possible to obtain final drawing results by the drawing processing unit 114 performing image combination of the drawing results by the remaining intermediate data (DL) stored in the RAM 109 and the backside image acquired from the band RAM 117. That is, in the fallback processing in the present embodiment, the following processing is substantially performed: (1) in order of drawing of a plurality of objects included in a page (for example, order of drawing of object A, object B, object C, and so on), intermediate data of a group of objects to be drawn earlier is generated and stored in the RAM 109, (2) bitmap data of the page is generated by performing rasterization based on the intermediate data stored in the RAM 109, of the group of the objects to be drawn earlier, (3) the generated bitmap data is stored in the band RAM 117, (4) the intermediate data stored in the RAM 109, of the group of the objects to be drawn earlier is deleted, (5) intermediate data of a group of objects to be drawn later is generated and stored in the RAM 109, (6) final bitmap data of the page is generated by performing rasterization based on the intermediate data stored in the RAM 109, of the group of the objects to be drawn later and the bitmap data stored in the band RAM 117. The final bitmap data obtained by the processing of item (6) corresponds to bitmap data that the objects to be drawn later are added to the bitmap data stored in the band RAM 117. As described above, by repeating the operation in accordance with the fallback processing until the intermediate data (DL) 202 is stored in the predetermined storage capacity on the RAM 109, it is possible to implement the drawing processing without being restricted by the limited hardware resources making up the image forming apparatus 100.

Next, with reference to FIG. 4A and FIG. 4B, the operation of the drawing processing at the time of PDL printing in an embodiment of the present invention is explained. FIG. 4A and FIG. 4B each show an operation in which drawing processing is performed in parallel in units of bands by using the intermediate data (DL) 202 and the compressed image data 205 primarily stored in the RAM 109 and the obtained image data 204 is stored in the RAM 109 at the time of fallback processing.

FIG. 4A shows the operation of drawing processing in a case in which the rectangular area in units of blocks is included in the rectangular area in units of bands as shown in FIG. 3B. In FIG. 4A, the image forming apparatus 100 performs drawing processing in parallel for each of a plurality of bands within a single page of the intermediate data (DL) 202 by using a first drawing processing unit 401 and a second drawing processing unit 402, making up the drawing processing unit 114. The first drawing processing unit 401 performs the drawing processing for odd-numbered bands within the single page while skipping even-numbered bands, and updates the position coordinates for each scan line of the drawing object. The second drawing processing unit 402 performs the drawing processing for even-numbered bands within the single page while skipping odd-numbered bands, and updates the position coordinates for each scan line of the drawing object. As described above, the first drawing processing unit 401 and the second drawing processing unit 402 acquire the drawing object that is the target of the drawing processing in units of bands, respectively, and, therefore, the intermediate data (DL) 202 primarily stored in the RAM 109 may be in units of pages or in units of bands.

Further, a first decompression processing unit 421 and a second decompression processing unit 422, making up the decompression processing unit 116, operate in conjunction with the first drawing processing unit 401 and the second drawing processing unit 402, respectively, making up the drawing processing unit 114. The first decompression processing unit 421 sequentially performs the decompression processing for the image data in units of blocks, which is acquired from the compressed image data 205 and which corresponds to band 1 and band 3 shown in FIG. 3B, and outputs the image data to a first band RAM 411 making up the band RAM 117. The second decompression processing unit 422 sequentially performs the decompression processing for the image data in units of blocks, which is acquired from the compressed image data 205 and which corresponds to band 2 and band 4 shown in FIG. 3B, and outputs the image data to a second band RAM 412 making up the band RAM 117.

In response to this, the first drawing processing unit 401 sequentially reads the image data in units of bands, which is primarily stored in the first band RAM 411 and which is made up of a plurality of blocks corresponding to band 1 and band 3 shown in FIG. 3B, and performs image combination at the time of drawing processing, and transfers the image data to the RAM 109. Similarly, the second drawing processing unit 402 sequentially reads the image data in units of bands, which is primarily stored in the second band RAM 412 and which is made up of a plurality of blocks corresponding to band 2 and band 4 shown in FIG. 3B, and performs image combination at the time of drawing processing and transfers the image data to the RAM 109.

The first band RAM 411 is made up of a double buffer capable of performing writing by the first decompression processing unit 421 and reading by the first drawing processing unit 401 at the same time. Consequently, for example, it is possible to perform the writing processing of blocks 31 to 34 corresponding to band 3 by the first decompression processing unit 421 and the reading processing of band 1 by the first drawing processing unit 401 at the same time. Similarly, the second band RAM 412 is made up of a double buffer capable of performing writing by the second decompression processing unit 422 and reading by the second drawing processing unit 402 at the same time. Consequently, for example, it is possible to perform the writing processing of blocks 41 to 44 corresponding to band 4 by the second decompression processing unit 422 and the reading processing of band 2 by the second drawing processing unit 402 at the same time.

As explained above, in the example in FIG. 4A, not only the hardware resource that is necessary for parallelization of the drawing processing unit 114, but also the decompression processing unit 116 and the band RAM 117 are necessary in the number corresponding to the number of parallel operations of the drawing processing unit 114.

FIG. 4B shows the operation of the drawing processing in a case in which the rectangular area in units of blocks is not included in the rectangular area in units of bands, as shown in FIG. 3C, and the number of pixels in the sub-scanning direction of the block unit is divided by the height (number of pixels) of a plurality of band units based on the number of parallel operations of the drawing processing unit 114. In FIG. 4B, the image forming apparatus 100 performs the drawing processing in parallel for each of a plurality of bands within the single page by using the first drawing processing unit 401 and the second drawing processing unit 402, making up the drawing processing unit 114. The first drawing processing unit 401 performs the drawing processing for odd-numbered bands within the single page while skipping even-numbered bands, and updates the position coordinates for each scan line of the drawing object. The second drawing processing unit 402 performs the drawing processing for even-numbered bands within the single page while skipping odd-numbered bands, and updates the position coordinates for each scan line of the drawing object. As described above, the first drawing processing unit 401 and the second drawing processing unit 402 acquire the drawing object that is the target of the drawing processing in units of bands, respectively, and, therefore, the intermediate data (DL) 202 primarily stored in the RAM 109 may be in units of pages or in units of bands.

The decompression processing unit 116 in FIG. 4B is made up of the single decompression processing unit 421 that operates in conjunction with both the first drawing processing unit 401 and the second drawing processing unit 402. The band RAM 117 is made up of the single band RAM 411.

The single decompression processing unit 421, making up the decompression processing unit 116, sequentially performs the decompression processing for the image data in units of blocks, which is acquired from the compressed image data 205 and which corresponds to band 11 and band 12 shown in FIG. 3C, and outputs the image data to the band RAM 411.

In response to this, the first drawing processing unit 401 sequentially reads the image data in units of bands, which is primarily stored in the RAM 411 and which corresponds to band 11 and band 21 shown in FIG. 3C, and performs image combination at the time of drawing processing, and transfers the image data to the RAM 109. Similarly, the second drawing processing unit 402 sequentially reads the image data in units of bands, which is primarily stored in the RAM 411 and which corresponds to band 12 and band 22 shown in FIG. 3C, and performs image combination at the time of drawing processing, and transfers the image data to the RAM 109.

The band RAM 411 is made up of a double buffer capable of performing writing by the decompression processing unit 421 and reading by the first drawing processing unit 401 and the second drawing processing unit 402 at the same time. Consequently, for example, it is possible to perform the writing processing of blocks 21 to 24 corresponding to band 21 and band 22 by the decompression processing unit 421 and the reading processing of band 11 by the first drawing processing unit 401 at the same time. Similarly, it is also possible to perform the writing processing of blocks 21 to 24 corresponding to band 21 and band 22 by the decompression processing unit 421 and the reading processing of band 12 by the second drawing processing unit 402 at the same time.

As explained above, in the example in FIG. 4B, even in a case in which parallelization of the drawing processing unit 114 is performed, it is sufficient for the number of hardware resources of the drawing processing unit 114 to be the same as the number of parallel operations of the drawing processing unit 114, and it is not necessary to add the hardware resources of the decompression processing unit 116 and the band RAM 117.

FIG. 5 shows the operation of the drawing processing in a case in which the parallel drawing processing setting information on the drawing processing unit 114 in the image forming apparatus 100 is changed, the second drawing processing unit 402 is suspended, and only the first drawing processing unit 401 is caused to operate in FIG. 4B. In this case, the number of parallel operations of the drawing processing unit 114 is one, and, therefore, the positional relationship is the same as that in FIG. 3B in which the rectangular area in units of blocks is included in the rectangular area in units of bands.

In FIG. 5, the single decompression processing unit 421 sequentially performs decompression processing for the image data in units of blocks corresponding to band 1 and band 2 shown in FIG. 3B and outputs the image data to the single band RAM 411 making up the band RAM 117.

In response to this, only the first drawing processing unit 401 sequentially reads the image data in units of bands, which is primarily stored in the band RAM 411 and which is made up of a plurality of blocks corresponding to band 1 and band 2, and performs image combination at the time of drawing processing, and transfers the image data to the RAM 119. In this manner, a single page is sequentially drawn in units of bands.

The band RAM 411 is made up of a double buffer capable of performing writing by the decompression processing unit 421 and reading by the drawing processing unit 401 at the same time. Consequently, for example, it is possible to perform the writing processing of blocks 21 to 24 within band 2 by the decompression processing unit 421 and the reading processing of band 1 by the drawing processing unit 401 at the same time.

As explained above, in the example in FIG. 5, even in a case in which the parallel drawing processing setting information on the drawing processing unit 114 is changed and part of the plurality of drawing processing units is suspended, it is possible to implement the same drawing processing as that at the time of parallel operation by causing the number of parallel operations of the drawing processing and the band height to correspond to each other.

FIG. 6 shows a flowchart of PDL printing processing in the image forming apparatus 100. The processing shown by the flowchart in FIG. 6 is performed by the CPU 108 executing a program loaded onto the RAM 109 of the image forming apparatus 100.

First, at step S601, the CPU 108 receives PDL data transmitted from the host computer via the communication unit I/F 107 and stores the PDL data as PDL data in units of pages in the RAM 109 or the HDD 111.

Next, at step S602, the CPU 108 interprets the stored PDL data in units of pages and generates intermediate data (DL) in units of bands, which is the target of drawing processing, based on the interpreted information.

Next, at step S603, the CPU 108 determines whether there is backside image data for image combination, which is used for the fallback processing in a case in which the generated intermediate data (DL) is greater than the predetermined storage capacity secured on the RAM 109. In a case in which there is backside image data for image combination, the processing advances to step S604 and the CPU 108 performs decompression processing of the backside image data by using the decompression processing unit 116. At step S604, the decompression processing unit 116 primarily stores the image data obtained by performing decompression processing in units of blocks for the compressed image data in the band RAM 117, as explained by using FIG. 4A, FIG. 4B, and FIG. 5. Consequently, the decompression processing unit 116 decompress the compressed image data corresponding to the bands required by the drawing processing unit 114 at step S606 to be performed later. On the other hand, in a case in which there is no backside image data for image combination, step S604 is skipped and the processing advances to step S605.

Next, at step S605, the CPU 108 sets the band height to the internal register of the drawing processing unit 114 as parallel drawing processing setting information. The band height setting processing at step S605 will be explained separately in detail by using the flowchart in FIG. 7.

Next, at step S606, the CPU 108 performs drawing processing in parallel in units of bands in accordance with the band height set at step S605 by controlling the drawing processing unit 114 and primarily stores the image data, which is the result of the drawing processing, in the RAM 109. The parallel drawing processing at step S606 will be explained separately in detail by using the flowchart in FIG. 8.

Next, at step S607, the CPU 108 performs compression processing by controlling the compression processing unit 115, converts the image data, which is the result of the drawing processing and which is primarily stored in the RAM 109, into compressed image data by compressing the image data, and stores the image data in the RAM 109 again.

Next, at step S608, the CPU 108 determines whether there is a drawing object not drawn yet, which is not stored in the RAM 109 due to the intermediate data (DL) generated based on the PDL data received at step S601. In a case in which there is a drawing object not drawn yet, the processing returns to step S602 and the processing is repeated as the fallback processing until there is no longer a drawing object not drawn yet. On the other hand, in a case in which there is not a drawing object not drawn yet, the processing advances to step S609, and the CPU 108 performs decompression processing by controlling the decompression processing unit 116, decompresses the compressed image data primarily stored in the RAM 109, and stores the image data in the RAM 109 again.

Next, at step S610, the CPU 108 reads the image data stored in the RAM 109 by controlling the printing unit I/F 118 and transfers the image data to the printing unit 105 after performing image processing for correction in accordance with the device characteristics of the printing unit 105.

After this, at step S611, the printing unit 105 prints the image data transferred from the printing unit I/F 118 on a printing medium.

The PDL printing processing by the image forming apparatus 100 is performed as explained above. Next, the band height setting processing at step S605 described above is explained.

FIG. 7 shows a flowchart of the band height setting processing at step S605 described above. The processing shown by the flowchart in FIG. 7 is performed by the CPU 108 executing a program loaded onto the RAM 109 of the image forming apparatus 100.

First, at step S701, the CPU 108 determines whether there is backside image data for image combination, which is used at the time of fallback processing, as at step S603. In a case in which there is no backside image data, the processing advances to step S702, and in a case in which there is backside image data, the processing advances to step S703.

In a case in which there is no backside image data, the operation in conjunction between the drawing processing unit 114 and the decompression processing unit 116 by using the RAM 117, which is explained with reference to FIG. 4A and FIG. 4B, is not performed. Consequently, at step S702, the CPU 108 determines the band height to be an arbitrary size in accordance with the storage capacity that can be secured in the RAM 109, and sets the band height to the internal register of the drawing processing unit 114. An arbitrary size means that it may also be possible to set any band height shown in FIGS. 3A to 3C.

On the other hand, in a case in which there is backside image data, at step S703, the CPU 108 acquires the block unit as the data unit that is handled inside the image forming apparatus 100. The block unit means the height and width of a rectangular area, and here, for simplicity, explanation is given on the assumption that the block unit has the shape of a square tile of eight pixels (height)×eight pixels (width). Consequently, the height of the block equals to eight pixels.

Next, at step S704, the CPU 108 acquires the number of parallel operations of the drawing processing unit 114 that performs the drawing processing in units of bands. For example, in a case in which the drawing processing unit 114 is in the operating state in FIG. 4B, as the number of parallel operations, two is acquired, and in the case of the operating state in FIG. 5, as the number of parallel operations, one is acquired by accessing the internal register of the drawing processing unit 114.

Next, at step S705, the CPU 108 determines whether or not the number of parallel operations acquired at step S704 is two or more. In a case in which the number of parallel operations is one or less, the processing advances to step S706, and in a case in which the number of parallel operations is two or more, the processing advances to step S707.

In a case in which the number of parallel operations is one or less, at step S706, the CPU 108 sets the block height acquired at step S703 as the height of the band that is processed by the drawing processing unit 114 as it is. For example, in the case of the operating state in FIG. 5, for the block unit of eight pixels×eight pixels, the number of parallel operations is one, and, therefore, the band height is calculated as 8 (=8±1), and this is set to the internal register of the drawing processing unit 114.

On the other hand, in a case in which the number of parallel operations is two or more, at step S707, the CPU 108 equally divides the block height acquired at step S703 by the number of parallel operations acquired at step S704. For example, in the case of the operating state in FIG. 4B, for the block unit of eight pixels×eight pixels, the number of parallel operations is two, and, therefore, the band height is calculated as 4 (=8±2).

Next, at step S708, the value calculated by equal division is set to the internal register of the drawing processing unit 114 as the band height.

As explained above, the band height is set based on the presence/absence of backside image data and the number of parallel operations of the drawing processing unit. Next, the parallel drawing processing at step S606 described above is explained.

FIG. 8 shows a flowchart of the parallel drawing processing at step S606 described above. The processing shown by the flowchart in FIG. 8 is performed by the drawing processing unit 114 by the CPU 108 executing a program loaded onto the RAM 109 of the image forming apparatus 100. In the following, explanation is given on the assumption that the drawing processing unit 114 operates based on the control of the CPU 108.

First, at step S801, a reading processing unit of each drawing processing unit that operates in parallel within the drawing processing unit 114 acquires the top address of the intermediate data (DL) set to the internal register of the drawing processing unit 114 by the CPU 108.

Next, at step S802, each drawing processing unit of the drawing processing unit 114 acquires the band height that is set to the internal register of the drawing processing unit 114 at step S605.

Next, at step S803, each drawing processing unit of the drawing processing unit 114 acquires the number of parallel operations to perform the drawing processing in units of bands inside the drawing processing unit 114 and the identification (ID) of its own from the internal register. For example, in the case of the first drawing processing unit 401 of the drawing processing unit 114 shown in FIG. 4B, two is acquired as the number of parallel operations and 1 is acquired as the ID of its own. Further, in the case of the second drawing processing unit 402, two is acquired as the number of parallel operations and 2 is acquired as the ID of its own.

Next, at step S804, each of the drawing processing units 401 and 402 of the drawing processing unit 114 acquires the drawing object included within the processing-target band from the intermediate data (DL).

Next, at step S805, each drawing processing unit of the drawing processing unit 114 collates the band number of the processing-target band with the ID of its own and determines whether or not the band is the drawing processing-target band for which each drawing processing unit itself performs the drawing processing. That is, for example, in the case of the first drawing processing unit 401 shown in FIG. 4B, the ID of its own is 1, and, therefore, the first drawing processing unit 401 determines that the odd-numbered bands, such as band 11 and band 21, shown in FIG. 3C, are the drawing processing-target bands of its own. Further, in the case of the second drawing processing unit 402 shown in FIG. 4B, the ID of its own is 2, and, therefore, the second drawing processing unit 402 determines that the even-numbered bands, such as band 12 and band 22, shown in FIG. 3C are the drawing processing-target bands of its own. In a case in which the processing-target band is the drawing processing-target band of its own, the processing advances to step S806, and in a case in which the processing-target band is not the drawing processing-target band, the processing advances to step S809.

At step S806, each drawing processing unit of the drawing processing unit 114 determines whether there is backside image data for image combination used for the fallback processing, as at step S603 described above. In a case in which there is backside image data, the processing advances to step S807, and each drawing processing unit acquires backside image data corresponding to the processing-target band from the band RAM 117. Here, the backside image data generated by the decompressing processing at step S604 described above is primarily stored in the band RAM 117 in the amount corresponding to the bands necessary to draw the processing-target band area, as explained by using FIG. 5. On the other hand, in a case in which there is no backside image data, step S807 is skipped, and the processing advances to step S808.

Next, at step S808, each drawing processing unit of the drawing processing unit 114 acquires the drawing object necessary to draw the processing-target band area from the intermediate data (DL) and outputs the image data, which is the drawing processing results, to the RAM 109. In particular, in a case in which the backside image data acquired at step S807 exists, each drawing processing unit performs image combination processing by referring to the backside image data, and generates image data, which is the drawing processing results.

On the other hand, at step S809, each drawing processing unit of the drawing processing unit 114 updates only the position coordinates for each scan line of the drawing object included in the processing-target band area and performs processing to skip reading of the intermediate data (DL) without performing the drawing processing of the band area.

Next, at step S810, each drawing processing unit of the drawing processing unit 114 determines whether or not the next processing-target band exists in the intermediate data (DL) stored in the RAM 109. In a case in which the next band exists, the processing returns to step S804, and the processing is repeated, and in a case in which the next band does not exist, the drawing processing of the page currently being processed is terminated.

As explained above, the parallel drawing processing is performed by the drawing processing unit 114.

Figure 9A:
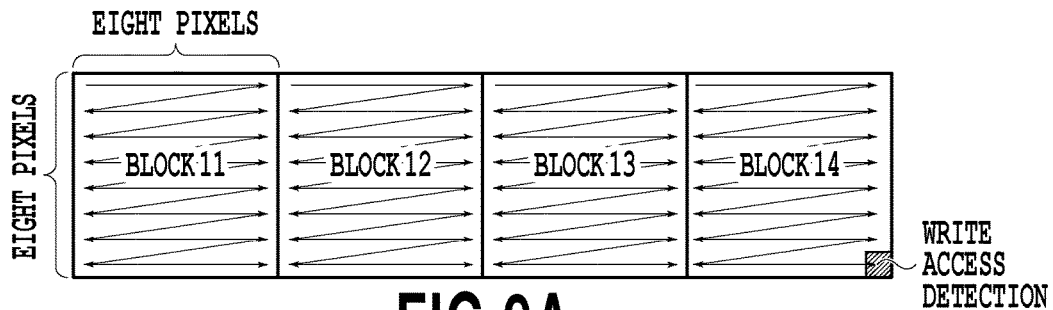
Figure 9B:
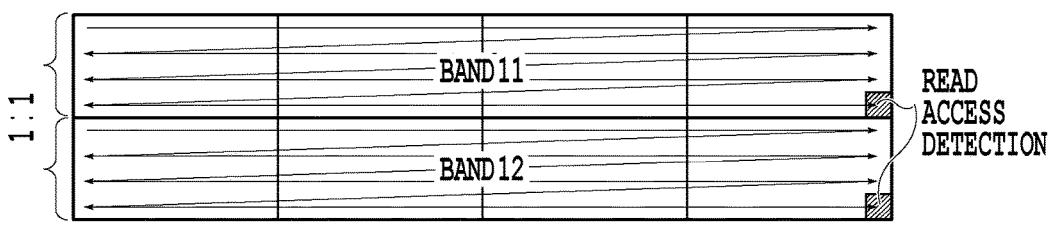
Figure 9C:
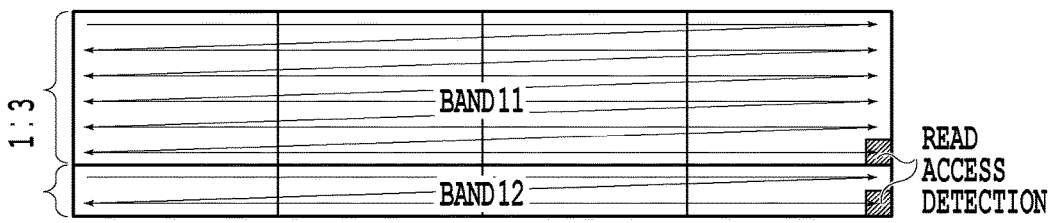

FIGS. 9A to 9E are diagrams explaining access control of writing in units of blocks and reading in units of bands. FIG. 9A shows image data that is written in units of blocks to the first band RAM 411 of the band RAM 117. FIG. 9B shows image data that is read in units of bands from the band RAM 117.

As shown in FIG. 9A, block 11 to block 14 are sequentially written to the first band RAM 411 by the first decompression processing unit 421 of the decompression processing unit 116. On the other hand, as shown in FIG. 9B, band 11 is read from the band RAM 117 by the first drawing processing unit 401 of the drawing processing unit 114 and band 2 is read from the band RAM 117 by the second drawing processing unit 402 of the drawing processing unit 114.

The first band RAM 411 controls the reading start of the drawing processing unit 114 with the writing of the image data to the address (pixel position) shown as write access detection in FIG. 9A as a trigger in order to cause the decompression processing unit 116 and the drawing processing unit 114 to operate in conjunction. It is possible to determine that the writing of the image data in units of bands by detecting that the image data in units of blocks has been written up to the address (pixel position).

Further, the first band RAM 411 controls the writing start of the decompression processing unit 116 with the reading of the image data from all the addresses (pixel positions) shown as read access detection in FIG. 9B similarly for the operation in conjunction. It is possible to determine that the reading of all the image data in units of bands including the image data in unit of blocks by detecting that the image data in units of bands up to all the addresses (pixel positions) has been read. This means that an empty area for new writing is produced in the first band RAM 411.

As explained above, according to an embodiment of the present invention, it is possible to implement the parallel operation of the first drawing processing unit 401 and the second drawing processing unit 402 without the need to increase the hardware resources of the decompression processing unit 116 and the band RAM 117 by the number corresponding to the number of parallel operations of the drawing processing unit. In other words, it is possible to increase the speed of the drawing processing by efficiently performing the parallel drawing processing while suppressing the cost from rising due to an increase of hardware resources.

First Modified Example

Next, a first modified example of the present invention is explained. In the band height setting processing in the above-described embodiment, the band height is set by equally dividing the block height based on the number of parallel operations of the drawing processing unit. On the other hand, in the present modified example, the band height is set by dividing the block height with a weight attached by also taking into consideration a difference in specifications (difference in performance) between each drawing processing unit, in addition to the number of parallel operations of the drawing processing unit.

FIG. 10 shows a flowchart of band height setting processing in the present modified example. The processing shown by the flowchart in FIG. 10 is performed by the CPU 108 executing a program loaded onto the RAM 109 of the image forming apparatus 100. The band height setting processing in the present modified example is a modified aspect of the band height setting processing explained with reference to the flowchart in FIG. 7, and, therefore, explanation of the portions in common to those in FIG. 7 is omitted, and only differences from FIG. 7 are explained. Specifically, steps S1001 to S1006 in FIG. 10 are the same as steps S701 to S706 in FIG. 7, respectively, and, therefore, explanation thereof is omitted.

In the band height setting processing in the present modified example, in a case in which the number of parallel operations of the drawing processing unit 114 is two or more, at step S1007, the CPU 108 acquires specification difference information on each drawing processing unit that operates in parallel. The specification difference information is, for example, a ratio of the operating frequency of the second drawing processing unit 402 to that of the first drawing processing unit 401, or, for example, a ratio of the number of processor cores or the number of modules of the second drawing processing unit 402 to that of the first drawing processing unit 401.

Next, at step S1008, the CPU 108 determines whether there is a difference in specifications between each drawing processing unit based on the acquired specification difference information. In a case in which the ratio of the difference in specifications is 1:1, and there is no difference in specifications, the processing advances to steps S1009 and S1010, and as at steps S707 and S708 in FIG. 7, the band height is calculated by equally dividing the block height, and the band height is set to the internal register of the drawing processing unit 114. On the other hand, in a case in which the ratio of the difference in specifications is 3:1, and there is a difference in specifications, the processing proceeds to step S1011.

At step S1011, the CPU 108 divides the single block height by attaching a weight based on the specification difference information on the drawing processing unit that operates in parallel. For example, in a case in which the ratio of the difference in specifications is 3:1 (number of parallel operations is two), as described above, the single block height is divided by attaching a weight in accordance with the number of parallel operations and the ratio of the difference in specifications as band 11 and band 12 shown in FIG. 9C. For example, in a case in which the single block height is eight pixels, division is performed by taking the height of the drawing area of the first drawing processing unit 401 to be six pixels and the height of the drawing area of the second drawing processing unit 402 to be two pixels.

Next, at step S1012, the value calculated by division with a weight attached is set to the internal register of the drawing processing unit 114 as the band height.

As explained above, according to the present modified example, by dividing the drawing area so that the difference in drawing speed becomes small in view of the number of parallel operations of a plurality of drawing processing units operating in parallel in the drawing processing unit 114 and the difference in performance (difference in specifications), it is made possible to increase the efficiency of the parallel operation. That is, in a case in which the drawing processing in units of bands is performed in parallel, it is possible to increase the speed of the drawing processing by shortening the wait time that is produced resulting from the slower processing speed of the processing speed of the first drawing processing unit 401 and that of the second drawing processing unit 402.

Second Modified Example

Next, a second modified example of the present invention is explained. In the present modified example, as a method of equally dividing the single block height by the number of parallel operations, as shown in FIG. 9D or FIG. 9E, a method of equally dividing by an integer multiple of the number of parallel operations is employed.

Figure 9D:
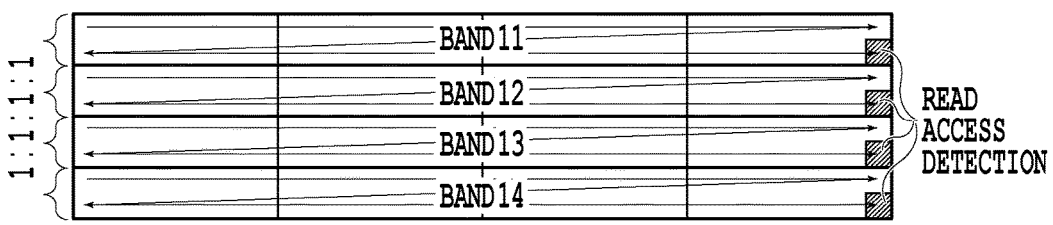

In the example shown in FIG. 9D, the number of parallel operations of the drawing processing unit is two, but the single block height is divided by 4, i.e., twice the number of parallel operations, that is, two. Then, control is performed so that the first drawing processing unit 401 draws band 11 and band 13, and the second drawing processing unit 402 draws band 12 and band 14.

Figure 9E:
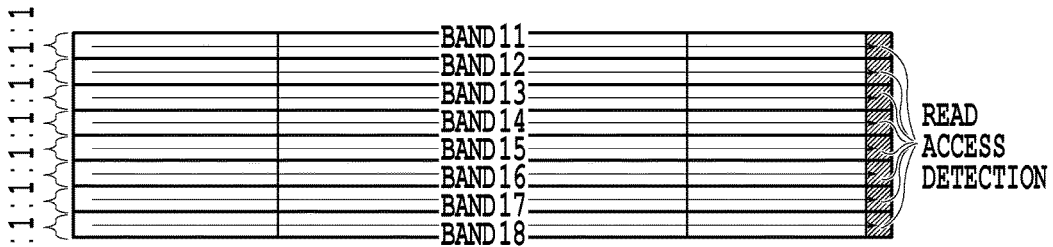

Alternatively, in the example shown in FIG. 9E, the number of parallel operations of the drawing processing unit is two, but the single block height is divided by 8, i.e., four times the number of parallel operations, that is, two. Then, control is performed so that the first drawing processing unit 401 draws band 11, band 13, band 15, and band 17, and the second drawing processing unit 402 draws band 12, band 14, band 16, and band 18.

As explained above, according to the present modified example, by reducing the band height, it is possible to arrange a drawing object larger than the band height so as to straddle over a plurality of bands. By doing so, it is possible to efficiently perform the parallel drawing processing by making small the difference in the drawing speed between each drawing processing unit that operates in parallel. That is, it is possible to make equal the drawing load of the first drawing processing unit 401 and that of the second drawing processing unit 402, and, therefore, it is possible to increase the speed of the drawing processing by shortening the wait time that is produced resulting from the slower processing speed of the processing speed of the first drawing processing unit 401 and that of the second drawing processing unit 402.

Third Modified Example

Next, a third modified example of the present invention is explained.

FIGS. 11A to 11E each show an example of a relationship between the block and the band within a page, which are defined in the present invention. As described above, the block is a rectangular area as the unit at the time of dividing and handling image data in units of pages within the image forming apparatus and, for example, has the shape of a square tile of 32 pixels×32 pixels. The band is a rectangular area whose number of pixels in the main scanning direction is greater than that of the block and whose number of pixels in the sub-scanning direction is less than or equal to that of the block as described above.

Figure 11A:
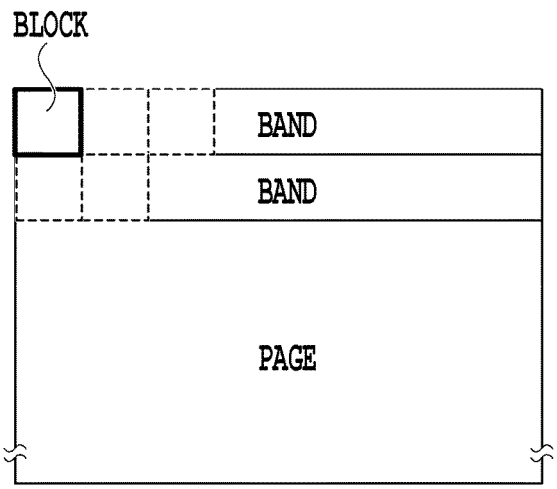
Figure 11B:
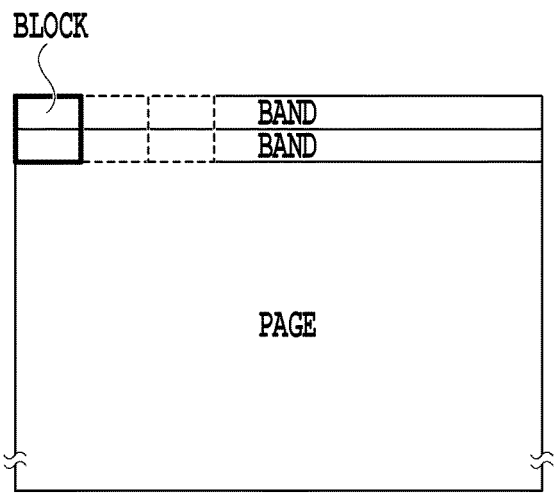

The relationship between the block and the band shown in FIG. 11A is a relationship in which the block is included in the band and the block height and the band height are equal. The relationship between the block and the band shown in FIG. 11B and FIG. 11D is a relationship in which the block is not included in the band and the band is not included in the block and the block height is divided by the height of a plurality of bands. In any of FIG. 11A, FIG. 11B, and FIG. 11D, the width of the band (number of pixels in the main scanning direction) and the width of the page are equal. In the present modified example, it may also be possible to switch the different relationships between the block and the band shown in FIG. 11A, FIG. 11B, and FIG. 11D depending on the drawing processing setting of the image forming apparatus 100.

Figure 11C:
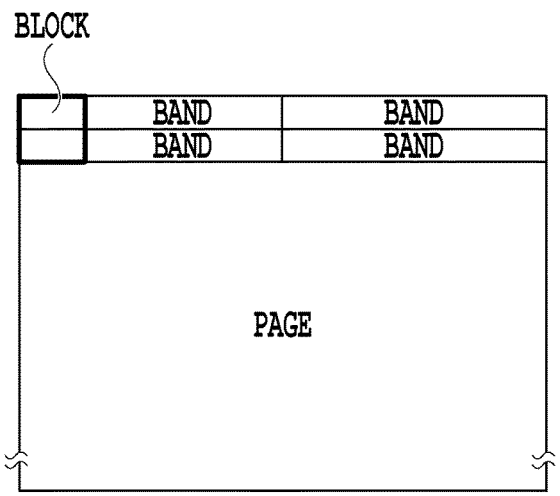
Figure 11D:
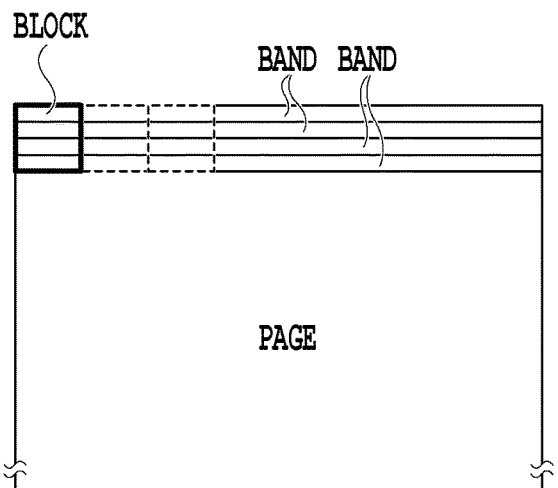
Figure 11E:
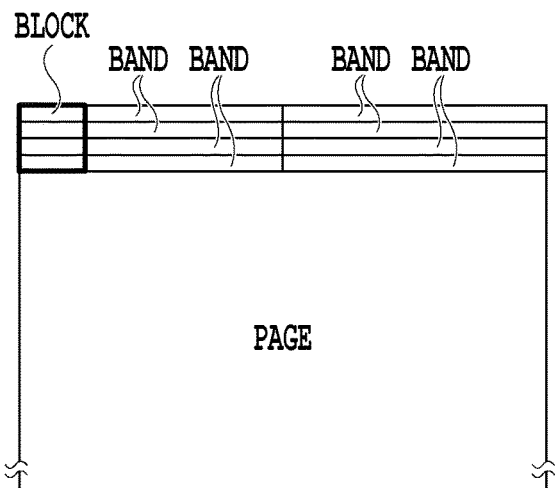

Further, FIG. 11C and FIG. 11E each show a relationship between the block and the band corresponding to FIG. 11B and FIG. 11D, respectively, but in FIG. 11C and FIG. 11E, the band width is divided in the main scanning direction. As described above, the band width is not limited to the page width and may be less than the page width. In this case, by performing the drawing processing for all the bands on the left side of the divided bands first, and then performing the drawing processing for the bands on the right side, the drawing processing in units of pages is performed.

As explained above, according to the present modified example, by performing the drawing processing by dividing the band unit in the main scanning direction to reduce the image data, it is possible to increase the speed of the drawing processing by efficiently performing the parallel drawing processing while further reducing the necessary memory capacity.

OTHER EMBODIMENTS

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

According to the present invention, it is possible to increase the speed of drawing processing by efficiently performing parallel drawing processing while suppressing the cost from rising due to an increase of hardware resources.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing method of performing rasterization of a page in units of band area, the image processing method comprising:
receiving page description data of the page;
generating first intermediate data to draw a first group of objects included in the page from a piece of the received page description data;
storing the generated first intermediate data into a first memory area for storing intermediate data;
performing, in units of band areas, rasterization based on the stored first intermediate data to generate a first raster data of the page, wherein the rasterization of a plurality of band areas is performed in parallel;
compressing, in units of predetermined areas, the first raster data generated by the rasterization of the first intermediate data, each predetermined area overlapping a plurality of adjacent band areas;
storing the compressed raster data into a second memory area;
deleting the first intermediate data from the first memory area for storing intermediate data;
generating second intermediate data to draw a second group of objects included in the page from another piece of the received page description data;
storing the generated second intermediate data into the first memory area for storing intermediate data;
performing, in units of band areas, rasterization based on the second intermediate data stored in the first memory area for storing intermediate data and the compressed raster data stored in the second memory area, wherein the rasterization of the plurality of band areas is performed in parallel, the performing of the rasterization based on the second intermediate data and the compressed raster data including selectively decompressing, in units of predetermined areas, a piece of the compressed raster data stored in the second memory area, in accordance with which band areas, of the plurality of band areas, are to be subject to the rasterization.

2. An image processing apparatus that performs rasterization of a page in units of band area, the image processing apparatus comprising:
a plurality of rasterizers that performs, in units of band areas, rasterization based on first intermediate data to draw objects included in one page to generate first raster data of the one page, each of the plurality of rasterizers being in charge of rasterization of band areas that are different from one another;
a compressor that compresses, a plurality of predetermined areas, the first raster data generated by the rasterization of the first intermediate data, each predetermined area overlapping a plurality of adjacent band areas; and
a decompressor that decompresses the compressed first raster data,
wherein the plurality of rasterizers further performs, in units of band areas, rasterization based on both second intermediate data to draw other objects included in the one page and the decompressed first raster data for the objects, each of the plurality of rasterizers being in charge of rasterization of band areas that are different from one another.

3. The image processing apparatus according to claim 2, wherein each rasterizer performs the rasterization based on a piece of the second intermediate data corresponding to a band area of which the rasterizer is in charge and a piece of the decompressed first raster data corresponding to a band area of which the rasterizer is in charge.

4. The image processing apparatus according to claim 2, wherein the plurality of rasterizers performs rasterization of a plurality of band areas in parallel.

5. The image processing apparatus according to claim 2, further comprising a processor that generates the first intermediate data and stores the generated first intermediate data in a predetermined sized memory area,
wherein the compressor stores the first raster data, having been compressed in units of the predetermined areas, in another memory area, and the processor deletes the first intermediate data from the predetermined sized memory area after the compressor stores the first raster data in the other memory area, and the processor generates the second intermediate data and stores the generated second intermediate data in the predetermined sized memory area.

6. The image processing apparatus according to claim 2, wherein each of a width and a height of a predetermined area, of the plurality of predetermined areas, corresponds to a plurality of heights of a band area.

7. An image processing apparatus that generates image data in a raster format by dividing intermediate data generated from drawing data into a plurality of band areas and performing drawing processing, the image processing apparatus comprising:
one or more processors that function as a plurality of drawing units that perform drawing processing in parallel for each of a plurality of pieces of intermediate data in units of bands, which corresponds to each of the plurality of band areas, a number of pixels in a main scanning direction of a band area being greater than that of a predetermined block area and a number of pixels in a sub-scanning direction being less than that of the predetermined block area; and
a storage that stores image data of one or more objects in one page in units of bands, which is generated from the intermediate data, by saving the image data of the one or more objects in a case in which a storage capacity for storing the intermediate data runs short in the drawing processing,
wherein each of the plurality of drawing units generates the image data of the one page in the raster format by combining the stored image data of the one or more objects, which is read from the storage, with image data of other objects of the one page, the image data of the other objects of the one page being generated by newly performing the drawing processing for the intermediate data.

8. The image processing apparatus according to claim 7, wherein a height of the band area is a value obtained by equally dividing the number of pixels in the sub-scanning direction of the predetermined block area by a number of parallel operations of the plurality of drawing units.

9. The image processing apparatus according to claim 7, wherein a height of the band area is a value obtained by weighting the number of pixels in the sub-scanning direction of the predetermined block area based on a difference in specifications between the plurality of drawing units, and performing weighted division.

10. The image processing apparatus according to claim 7, wherein the storage controls a writing start of image data in units of blocks corresponding to new image data in units of bands generated from the intermediate data upon detecting that reading of the new image data in units of bands by the plurality of drawing units is completed.

11. The image processing apparatus according to claim 7, wherein the storage controls a reading start of the image data in units of bands by the plurality of drawing units upon detecting that writing of image data in units of blocks corresponding to the image data in units of bands is completed.

* * * * *